INVENTOR.
Wilhelm J. Lohninger

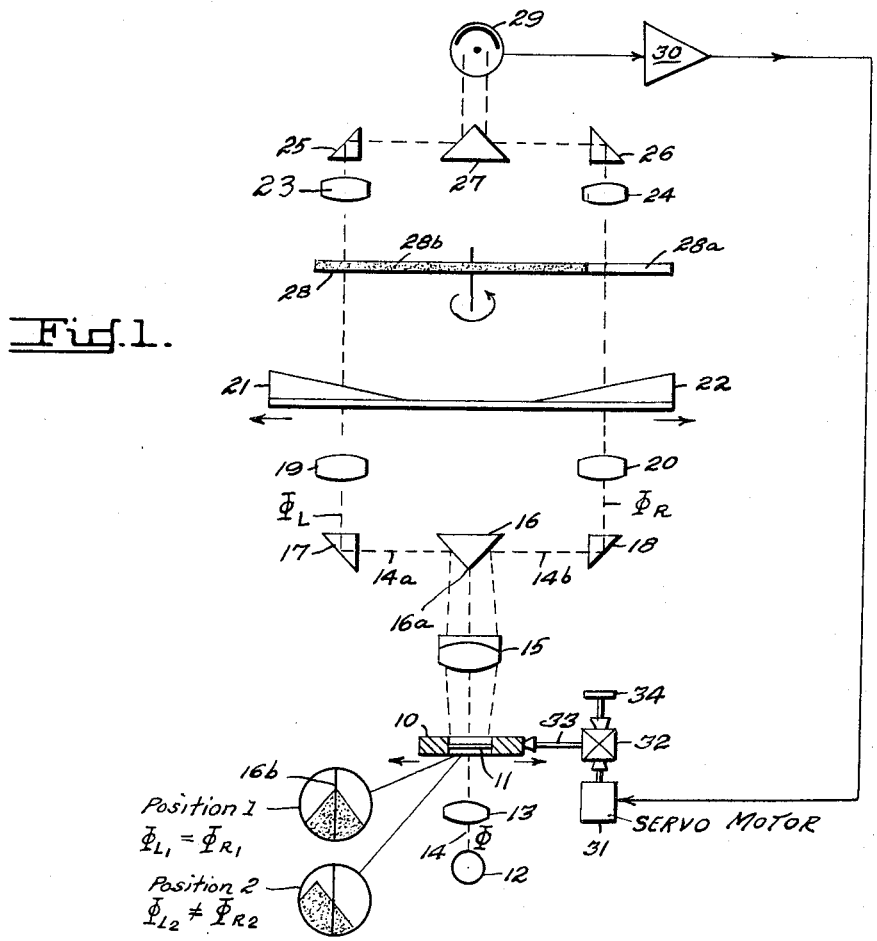

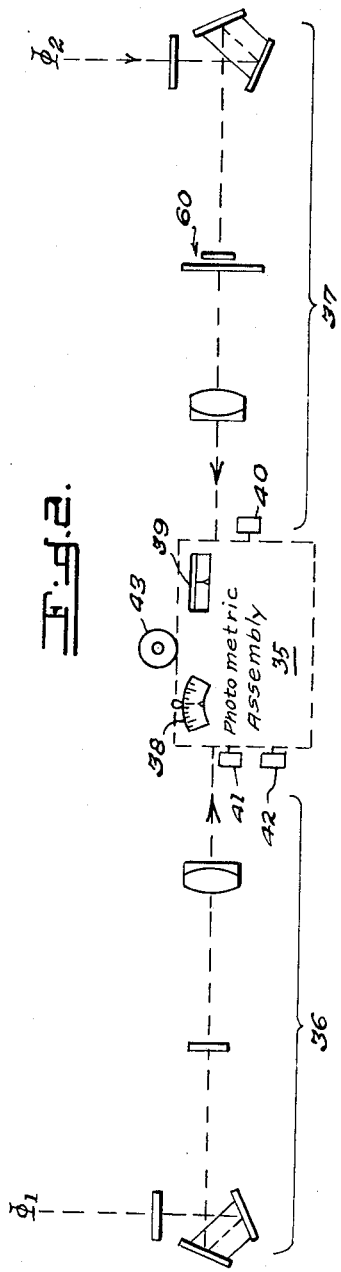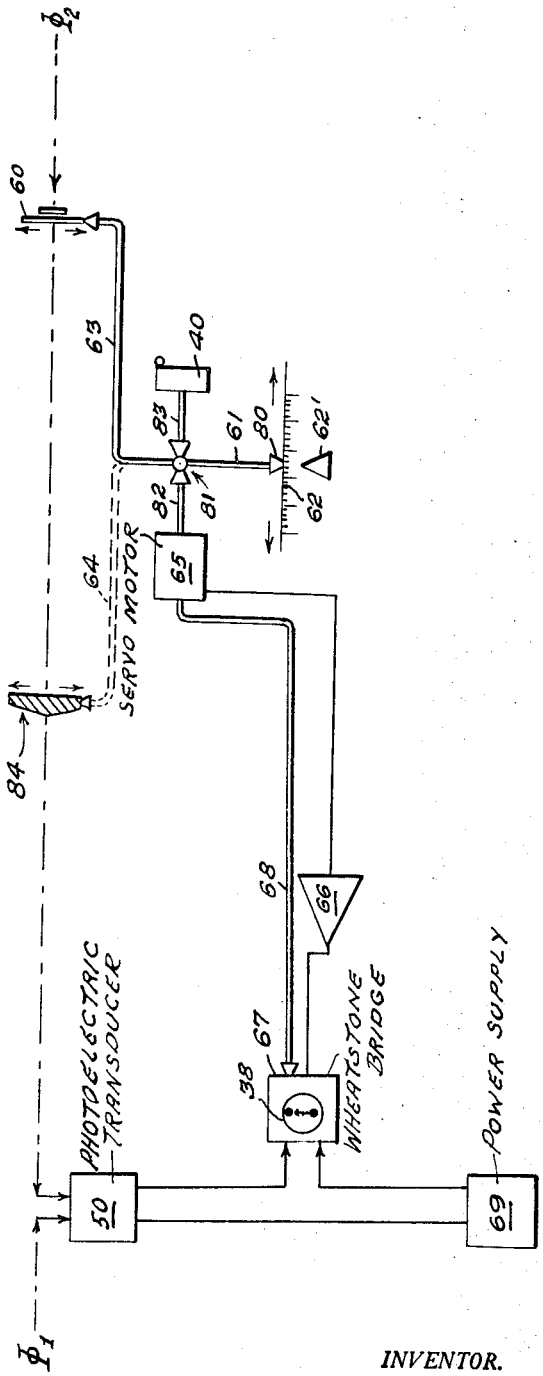

Oct. 17, 1967  W. J. LOHNINGER  3,347,129
PHOTOELECTRIC RANGE FINDER
Filed Oct. 29, 1964  5 Sheets-Sheet 4
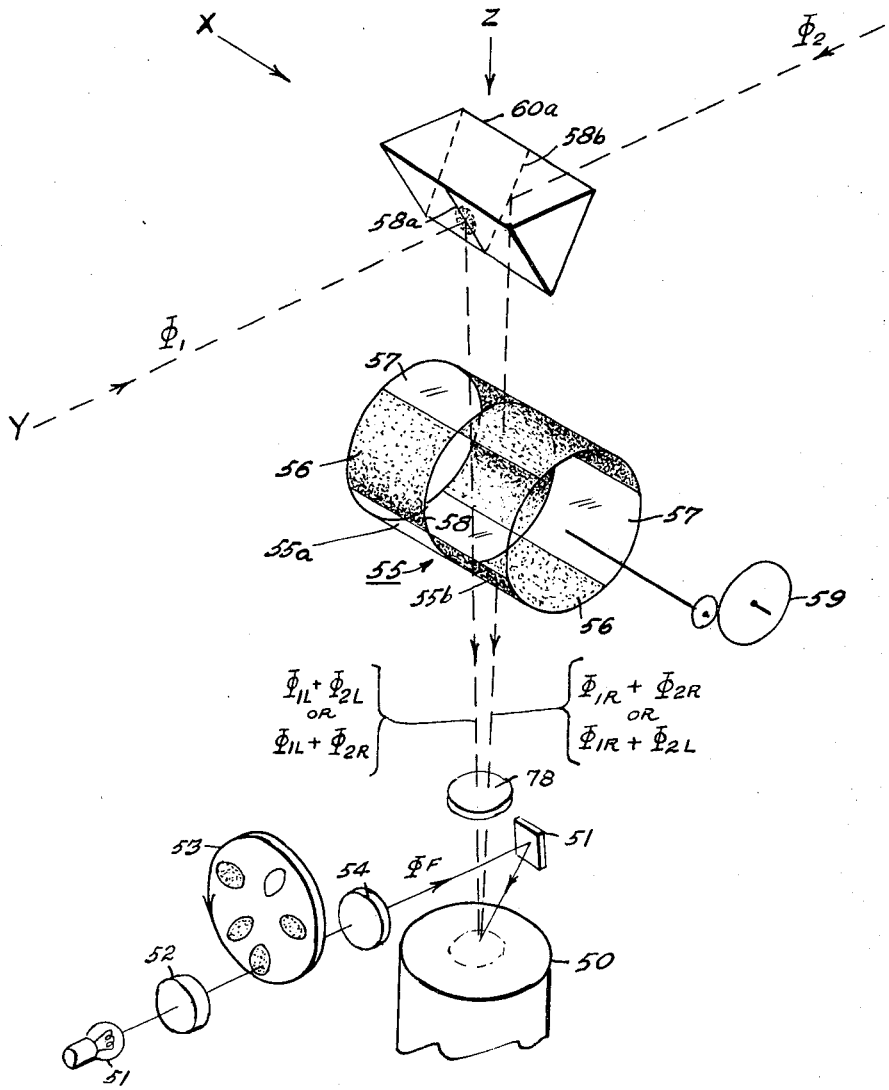
INVENTOR.
Wilhelm J. Lohninger
BY: Harry M. Saragovitz,
Edward J. Kelly &
Herbert Berl Oct. 17, 1967    W. J. LOHNINGER    3,347,129
PHOTOELECTRIC RANGE FINDER
Filed Oct. 29, 1964    5 Sheets-Sheet 5

INVENTOR.
Wilhelm J. Lohninger
BY: Harry M. Saragovitz,
Edward J. Kelly &
Herbert Berl

3,347,129
PHOTOELECTRIC RANGE FINDER
Wilhelm J. Lohninger, Rockaway, N.J., assignor to the United States of America as represented by the Secretary of the Army
Filed Oct. 29, 1964, Ser. No. 407,590
9 Claims. (Cl. 88—1)

The invention described herein may be manufactured and used by or for the Government for governmental purposes, without the payment to me of any royalty thereon.

The invention relates generally to range determination and more particularly to a device and method for making range measurements.

A requirement exists for a portable range finder to be used with certain of the new weapon systems. Accurate range measurement for distances up to 4000 yards is required with the extremely severe accuracy requirement of 4 to 6 yards acceptable error, 0.1% to 0.15%, at maximum range.

Basically, the problem of range determination with a single beam range finder of the coincidence or stereoscopic type is the problem of measuring the angle at the target or at the base. Thus, in one sense, purely geometric factors are of importance.

More important, however, the actual process of range determination by a human operator using a single base range finder is quite a complex process involving the interactions among: the physical and geometrical characteristics and properties of the instrument, target and target space; the information acquired by the operator's eyes, that is, information required with the help of physiological factors; and finally the processing of the data of the physical and geometrical characteristics acquired by the operator's eyes and brain or mind, that is, purely psychological factors influence the process of range determination, and the processed data is then mentally projected back into visual space as perceived range.

A compilation of physical and human factors interacting in the process of range determination shows that the accuracy of range determination is mostly limited by human factors and not by instrumental inaccuracies, which in up to date range finders are minimized to extremely small values.

In a modern stereoscopic range finder the operator normally performs the combined processing of the factors described above. In other words the operator has to perform: the aiming of the instrument onto the target with the help of the sighting scale; the bringing of the ranging dot into stereoscopic or depth coincidence with the target image by turning the range knob, or in the case of a coincidence range finder, he brings the two split target images into coincidence with respect to a contour line; and finally, the reading of the range on the range scale, that is, the operator has to determine another coincidence between the indication pointer and a scale division or to estimate the position of the pointer between two scale divisions.

It is the last two coincidence processes to be performed by the operator which limit the accuracy of range determination. These inaccuracies are intrinsically connected with the physiological and psychological characteristics of the human operator, who moreover is subjected to fatigue and mental strain. Furthermore, the human coincidence error of bringing the ranging dot into stereoscopic or depth coincidence with the target image has been found to increase with increasing range.

It is thus observed that the extremely accurate requirements necessary for a more accurate range finder can never be fulfilled by a combination consisting of a conventional stereoscopic or split image coincidence range finder and a human operator. To avoid as far as possible the physiological and psychological operator error, he should be relieved from the task of ranging coincidences by either stereoscopic or split image means. As will be shown later in this specification, this requirement may be fully fulfilled by fully automatic ranging in which case the operator has only to sight the instrument and read the indicated range in digital numbers, or by semi-automatic ranging in which case the operator has to sight the instrument, turn the range knob until the coincidence between a pointer and a scale division on a zero instrument is made to read the range as before. To relieve the operator from the task of determining range by reading or interpreting the relative position between a pointer and scale divisions on the range scale, the obvious solution would be to present the range as digital numbers on a counter or register. Seen from another point of view this means the substitution of a photoelectric transducer, unaffected by fatigue, for the operator's eyes and an electronic computer which can be an electric bridge with the application of the well known balancing or zero principle for the operator's mind.

Accordingly, it is a primary object of the invention to provide a method to rapidly determine the range of an object.

Another object of the invention is to provide an improved range finder which is new in concept, design, configuration and size.

A further object of the invention is to provide a range finder in which a novel chopper concept is incorporated with the optics.

Still another object of the invention is to provide a range finder which is minutely accurate in depth perception, simple to operate and completely portable.

Still a further object of the invention is to provide a method of range determination which eliminates forward spotters, triangulation or the use of spotting charges.

More specifically an object of the invention is to provide a range finder in which a photoelectric transducer is substituted for an operator's eyes and an electric computer is substituted for an operator's mind.

Broadly stated, this invention comprises optical means for receiving and focusing the target image of the object being tracked onto a photocell. The electrical output of the photocell is then either fed to servo means or to zero balancing means used in conjunction with a range determinator which restores photometric equilibrium.

In more specific terms, the invention comprises an optical system which projects two symmetrically incoming light beams or fluxes onto a photoelectric unit. The two opposite beams arrive at the edges of a double beam splitter prism in a photometric unit and after being split, each in two halves, are reflected onto two mirrors. These mirrors reflect the four halves of the beams through lenses and through a chopper disc onto a photoelectric transducer. Any difference of the light intensities in the two parallel beams is sensed by the photocell, and its output signals actuate means which restore photometric equilibrium and provide a measurement of the distance to the object under observation. Photometric equilibrium is restored generally by moving the beam splitter prism to a position whereby the beam intensities are equalized. Additionally, an artificial light beam of variable intensity and color, after passing through a filter, can be projected onto the photocell to provide for more accurate readings under varying target light conditions.

The novel features that are considered characteristic of the invention are set forth with particularity in the appended claims. The invention itself, however, both as to organization and method of operation, as well as ad- 3,347,129

3 ditional objects and advantages thereof, will best be understood from the following description taken in connection with the accompanying drawings, in the several figures of which like numerals identify like elements, and in which:

FIGURE 1 is a diagram which illustrates the principles of the invention;

FIGURE 2 is a diagram showing the general layout of one embodiment of the photoelectric range finder of the invention.

FIGURE 5 is a schematic exploded view of the photometric assembly illustrating the beam splitter chopper, an alternative embodiment of the light chopper shown in FIGURES 3 and 4.

FIGURE 6 is a diagram illustrating the manual and automatic range determination systems of the range finder.

Figure 3:
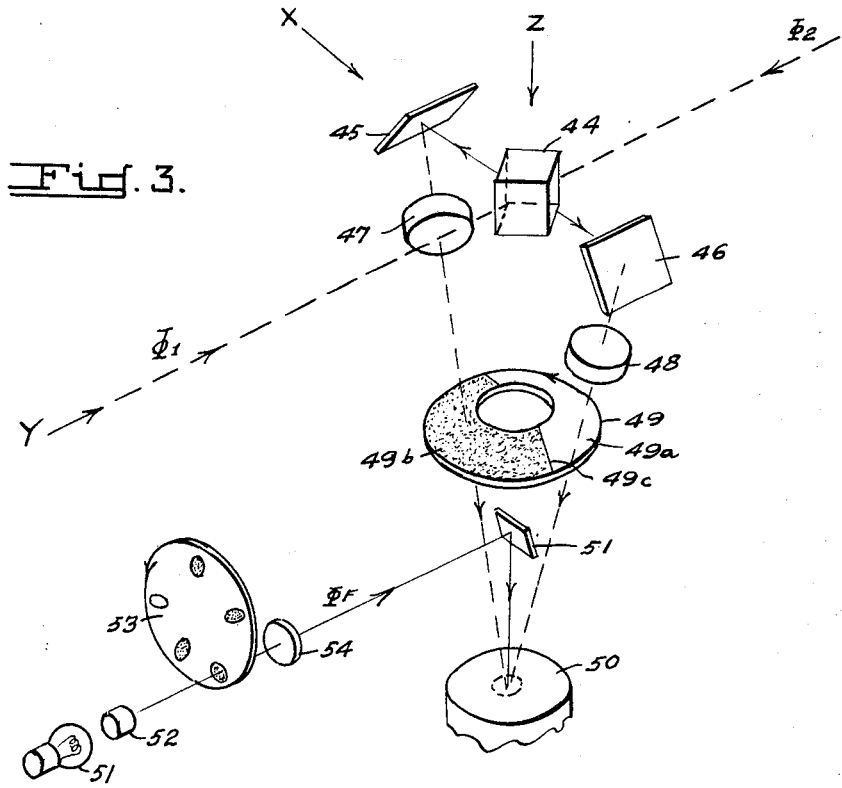
FIGURE 3 is a schematic exploded view of the photometric unit employing a chopper disc.

Referring now to the schematic diagram of FIGURE 1, the target simulating image is located on a transparent glass slide 11 mounted in a holder 10. A low intensity light source 12 provides the required illumination for the target image through a condenser lens 13. Thus it can be seen that a single light beam 14 is provided to present a target image to the remainder of the system which contains luminous flux $\Phi$. After leaving the glass slide 11 light beam 14 passes through collimator 15 and is split by a beam splitting prism 16 into two beams 14a and 14b. It must be noted here that the edge 16a of prism 16 (or, what is the same as the dividing vertical 16b in the target image) represents the axis of photometric symmetry or equilibrium. Beam 14a after leaving prism 16 is passed to a beam collecting prism 27 through a total reflecting prism 17, lens 19, balancing wedge 21, lens 23, and another total reflecting prism 25. Beam 14b is also passed to beam collecting prism 27 in a parallel path to beam 14a through right angle reflecting prism 18, lens 20, balancing wedge 22, lens 24 and a total reflecting prism 26. The flux of beam 14a is identified as $\Phi_L$, while the flux of beam 14b is identified as $\Phi_R$.

Interposed between the lenses 23, 24 and balancing wedges 21, 22 is a light chopper 28. Light chopper 28 normally consists of a flat or slightly conical disc, one half 28a of which is transparent and the other 28b opaque. The disc is rotated by motor means (not shown) whereby the parallel beams 14a and 14b are interrupted and thus modulated.

Beam collecting prism 27 is used to direct the chopped light beams into a photoelectric transducer 29. The output signals of transducer 29 are then amplified by a servo amplifier 30 which in turn controls a servo motor 31. Servo motor 31 operates a differential gear train 32. Extending from differential 32 is a connecter 33 which is also fastened to holder 10 providing means for adjusting glass slide 11 to the desired position. A displacement micrometer 34 can be provided to vary the photometric equilibrium by adjusting the glass slide 11 as desired and thus begin the operation of the device.

In operation of the device, assume the glass slide 11 is put in position 2 by displacement micrometer 34. Therefore, it can be seen that a greater amount of flux will result in the right-hand portion of the light beam 14 after it is split by prism 16. Thus, $\Phi_{L_2}$ will be smaller than $\Phi_{R_2}$. Thereafter both beams 14a, 14b are interrupted by chopper 28 and united by prism 27 and are then directed onto photoelectric transducer 29. The am-

4 plified output signals of the transducer are fed to servomotor 31 which restores photometric equilibrium by moving back the glass slide to its original balanced position, position 1, through differential gear train 32 and connector 33. Position 1 of the glass slide indicates the condition of photometric equilibrium and $\Phi_{L_1}$ is now equal to $\Phi_{R_1}$. In other words, any difference of the light intensities in the two parallel beams is sensed by a photocell, its output signals actuate a servomotor and compensation is accomplished so that photometric equilibrium is automatically restored.

Theoretically it appears that it might be simpler to discard the beam chopper and project a measuring and compensating beam onto photocells. However, extended tests of the highest accuracy showed that it was practically impossible to obtain two photocells with absolutely identical characteristics such as sensitivity, sensitivity distribution over the sensing area, ratio of light flux to photoelectric current, aging and inherent systematic errors. Therefore, this possibility is not the solution because the only apparent simplification has to be paid for by decreased accuracy and additional error sources.

FIGURE 2 shows an approach for the general layout of the photoelectric range finder wherein 35 is the photometric assembly having coupled thereto telescope assemblies 36 and 37 for projecting light beams or fluxes $\Phi_1$ and $\Phi_2$, respectively, into the photoelectric transducer of the photometric assembly. The zero indicator 38, range scale 39 and control knob therefor 40, filter 41 and lamp 42 are mounted in the housing of the photometric assembly 35 and sighting telescope or binocular 43 is mounted on the top of the housing and centrally between the extremities of telescopes assemblies 36 and 37. Since the operator has mainly to aim the instrument with sighting telescope 43 and not through the optical systems 36 and 37 of the range finder, the telescope assembly is much simpler with respect to optical elements. The two symmetrically incoming light beams or fluxes $\Phi_1$ and $\Phi_2$ are projected by means of the telescope assemblies into the photoelectric transducer of the photometric assembly.

FIGURE 3 shows an exploded view of the photometric unit wherein the two opposite light beams $\Phi_1$ and $\Phi_2$ arrive at the two edges of the double beam-splitter prism 44 and after being split, each into two halves, are reflected onto mirrors 45 and 46. These mirrors reflect the four halves of the beams through lenses 47 and 48 and chopper disc 49 onto the photoelectric transducer 50. The chopper disc 49 may be driven by either an electric motor or clock mechanism, not shown. Additionally, an artificial light beam $\Phi_F$ generated by lamp 51 is reflected onto photoelectric transducer 50 by mirror 51 through condenser lens 52, contrast filter 53 and window 54 to provide for more accurate readings under varying target light conditions.

Figure 4:
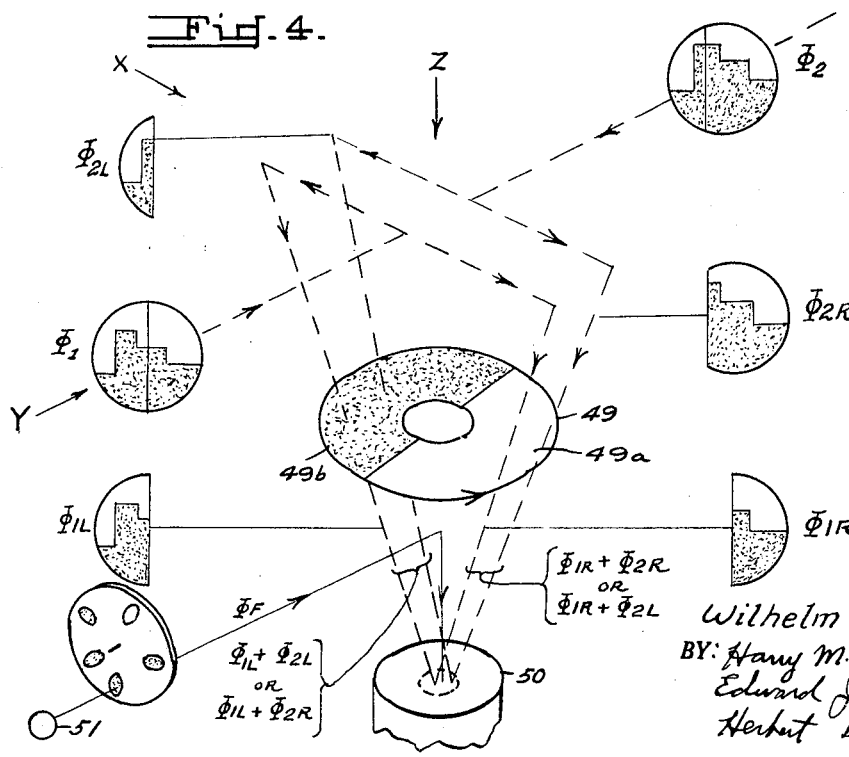
FIGURE 4 is a schematic view of the optical paths of the photometric unit of FIGURE 3.

FIGURE 4 illustrates a more detailed presentation of the purely optical-photometric effects of the two splitting edges on the two light beams or fluxes $\Phi_1$ and $\Phi_2$. $\Phi_1$ shows the field of view, that is, target contour, background and splitting vertical of the left beam. Since the right beam $\Phi_2$ arrives at the right splitting edge with a different angle, corresponding to angle of range, its field of view, containing also target contour and background, is split differently than $\Phi_1$, as indicated by the position of the splitting vertical in $\Phi_2$. $\Phi_1$ is split into two different partial light fluxes $\Phi_{1L}$ and $\Phi_{1R}$. $\Phi_2$ is split into two other and different light fluxes $\Phi_{2L}$ and $\Phi_{2R}$. The suffixes R and L indicate right and left partial light flux, respectively. Obviously $\Phi_{1L} \neq \Phi_{2L} \neq \Phi_{1R} \neq \Phi_{2R}$. These four different partial light fluxes can be added by the two reflecting mirrors 45 and 46 into four different sums: $\Phi_{1L}+\Phi_{1R}$, $\Phi_{2L}+\Phi_{2R}$, $\Phi_{1L}+\Phi_{2R}$, $\Phi_{1R}+\Phi_{2L}$. The latter two sums are simply realized by inverting either $\Phi_1$ or $\Phi_2$ by well known optical. To restore photometric equilibrium between these four sums, they must be added to conform to the following equations for photometric equilibrium:

$$\Phi_{1L}+\Phi_{2L}=\Phi_{1R}+\Phi_{2R} \text{ or } \Phi_{1L}+\Phi_{2R}=\Phi_{1R}+\Phi_{2L}$$

These equations are realized by optically deflecting $\Phi_2$ which is achieved with compensator arrangement by the ranging knob such that the right edge of the double beam splitting prism 44 divides the field of view of $\Phi_2$ in exactly the same manner as the left splitting edge divides $\Phi_1$. The compensating deflection of $\Phi_2$ corresponds photometrically to the displacement of the dividing vertical of $\Phi_2$ or, the compensating deflection of $\Phi_2$ restores the photometric axis of symmetry or photometric equilibrium in the field of view of $\Phi_2$. Both light flux sums of either one of the above equations are now photometrically identical. Therefore, the electric output signals produced by these light fluxes, alternatingly impinging onto the photoelectric transducer 50 are also equal; this is indicated on the electric zero instrument which may consist of a Wheatstone bridge with a milliammeter 38 across one of its diagonals. Or, explained in a more simple manner, to perform range determination this principle uses photometric equilibrium represented by the photometric coincidence of two target image dividing verticals instead of a direct optical coincidence. Theoretically it would seem that the practical realizations of the above mentioned two equations are also technically equal. However, a closer analysis, also proved by experiments, shows that this is not true. Assume the first of the two equations is realized. Let it further be assumed that one or the other of the two beams $\Phi_1$ and $\Phi_2$ is in some way effected by a disturbance, for example, by an optical obstacle. The photometric effect of this disturbance affects therefore solely either the one or the other of the two light flux sums, causing an unbalance in the equation and so an erroneous range indication. In the case of a realization of the second equation, $\Phi_{1L}+\Phi_{2R}=\Phi_{1R}+\Phi_{2L}$, each of the two light flux sums consist of mixed partial light fluxes of both beams $\Phi_1$ and $\Phi_2$. Therefore, the photometric effect of optical obstacle affects both sides of this equation equally and is therefore automatically cancelled out.

The chopper 49 shown in FIGURES 3 and 4 consists of a flat or slightly conical disc, one half 49a being transparent and the other half 49b being opaque. The disc is rotated by means of a motor, not shown, and so modulates alternatingly the two beams. As can be seen, there exist positions of the disc in which the line 49c dividing the transparent and opaque sections cuts simultaneously both beams. Therefore, the photoelectric transducer 50 receives periodically and simultaneously light fluxes of a certain duration of both beams. As a consequence, this geometry of the chopper 49 produces error components in the electrical output signals which cause inaccuracies. Where extreme accuracy is a factor, the inaccuracies inherent in the aforementioned disc type chopper have to be avoided, that is, the geometry of the chopper has to be changed so that overlapping of the two beams is avoided. Another embodiment of the photometric assembly of the range finder is illustrated in FIGURE 5 wherein a cylindrical type light chopper 55 is utilized to suppress the effect of overlapping of the two beams. The chopper 55 consists of a cylinder divided into two halves 55a and 55b, each half is provided alternately with opaque and transparent segments 56 and 57, respectively. One opaque segment of one half corresponds to a transparent segment in the other half. The line or edge 58 separating the halves 55a and 55b corresponds to the two splitting edges of the double beam splitter prism 44 of FIGURE 3. Reference numerals 58a and 58b indicate the projection on beam deflecting prism 60a of the beam splitting line or edge 58. Reference numeral 59 indicates motor means for rotating chopper 55. The two deflecting mirrors 45 and 46 are no longer necessary, thereby reducing the optical elements by two. Chopper 55 provides, at the same time beam splitting, beam modulation and a reduction in the number of optical elements. Chopper 55 also assures a sharp cut-off of the beams as well as an absolute suppression of the aforementioned overlapping of the beams. 78 is a window which the mixed light fluxes of beams $\Phi_1$ and $\Phi_2$ pass prior to striking photoelectric transducer 50.

Referring now to FIGURE 6, the balancing or restoration of photometric equilibrium, identical with the effectuation of photometric coincidence, can be obtained by the compensation method used in conventional range finders. For example, the deflection of the beam $\Phi_2$ is made by an optical compensator 60 which may consist of a fixed and a movable planconvex and planconcave lens, or of a deflection wedge. The balancing or restoration of photometric equilibrium may also be obtained by decreasing the light flux in two of the four partial light fluxes through means of an absorption wedge 84. The effectuation of photometric coincidence realized by optical compensation of $\Phi$ is the basic principle of photoelectric range determination. When manual control is utilized in range determination, the electric output signals of photoelectric transducer 50 are coupled across one diagonal of a Wheatstone bridge 67 having a milliammeter 38 connected across its other diagonal as a zero indicator. Turning of the range knob 40 actuates simultaneously the range scale 62 with reference to range scale pointer 62′, through cable 61, and the optical compensator 60, through cable 63, and so deflects $\Phi_2$. If the absorption wedge 84 is used instead of compensator 60, turning range knob 40 simultaneously actuates the wedge 84 through cable 64 and range scale 62. When photometric coincidence occurs, the pointer of the electric zero instrument 38 stays fixed on the zero division and the range can be read on the range scale 62. Mechanical gear 80 couples the range scale 62 to cable 61. Mechanical gearing 81 couples servomotor 65 and range knob 40 through cables 82 and 83, respectively, to absorption wedge 84 through cable 64, optical compensator 60 through cable 63 and range scale 62 through cable 61. In the automatic position, the electric output signals of photoelectric transducer 50 are fed into the Wheatstone bridge 67 the output of which is coupled to servomotor 65 by means of servoamplifier 66. Servoamplifier 66 amplifies the error signal of bridge 67 and applies it to servomotor 65 which actuates simultaneously the wiper of a potentiometer, not shown, forming one branch of the bridge, the range scale 62 and the optical compensator 60, or absorption wedge 61, deflecting $\Phi_2$. Reference numeral 68 indicates the cable coupling the servomotor 65 to the wiper arm of the aforementioned potentiometer. When photometric coincidence, identical with electrical equilibrium in the bridge, is accomplished the bridge ceases to deliver an error signal which is indicated by zero reading on zero indicator 38, and then the range is read on the range scale 62. The power supply 69 provides electrical energy for lamp 51 and the Wheatstone bridge 67.

Figure 7:
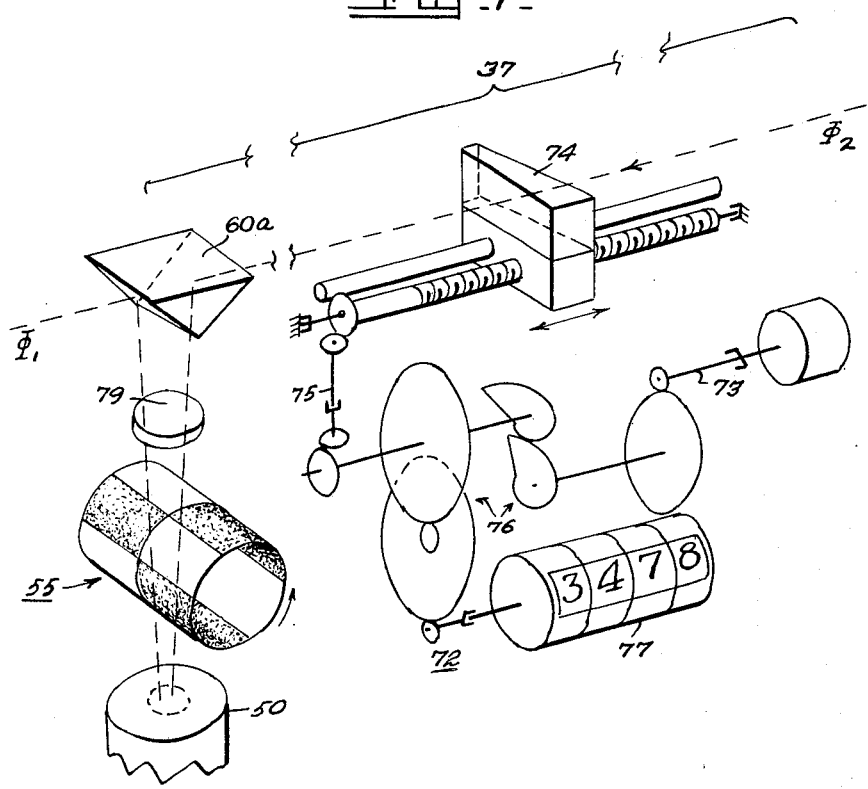
FIGURE 7 is a diagram showing optical balancing by means of a deflection wedge and range indication by means of a cyclometric register.
Figure 8:
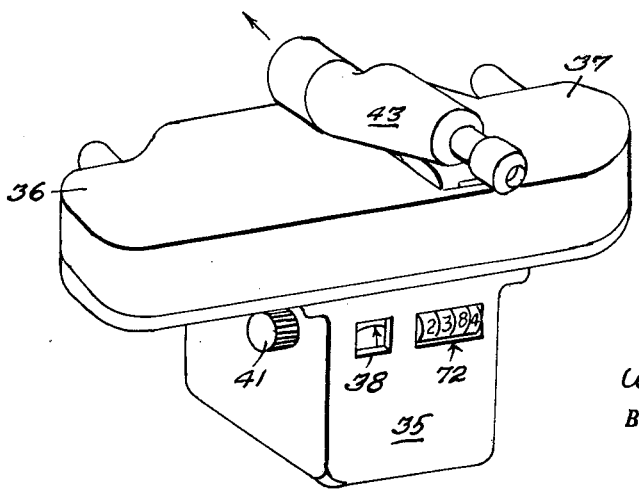
FIGURE 8 is a perspective view showing the photoelectric range finder assembly.

To relieve the operator from the task of determining the range by reading or interpreting the relative position between the pointer and scale divisions on the range scale, FIGURES 2 and 6, a cyclometric register, FIGURE 7, generally indicated by reference numeral 72, is incorporated in telescope assembly 37. The cyclometric register can be actuated either by the range knob or by the servomotor in a manner as shown in FIGURE 6 by coupling the knob and servomotor to shaft 73. An optical compensator, which may be a deflection wedge 74, for deflection of $\Phi_2$ is incorporated in telescope assembly 37 and is coupled to the cylometric register by means of shaft 75 for transmitting the range data to the gear and cam assemblies 76 of the cyclometric register to actuate the counter 77 which indicates the range in digital numbers. 79 indicates a window through which light beams $\Phi_1$ and $\Phi_2$ pass.

Although specific embodiments of this invention have been illustrated and described, it will be understood that this is but illustrative and that various modifications may be made therein without departing from the spirit of this invention and the scope of the appended claims.

I claim:
1. A photoelectric range finder comprising a first and second telescope laterally spaced from each other for obtaining light beams containing the image of a target, a target acquisition telescope positioned intermediate said first and second telescopes and movable in the same plane therewith, adjustable optical compensator means in said second telescope for image coincidence, a double beam splitting prism positioned between the exit ends of said first and second telescopes whereby the light beams from said first and second telescopes are each split into a pair of parallel beams, a photoelectric transducer, a light chopper positioned intermediate said prism and photoelectric transducer, means for directing the two pairs of parallel beams formed by said double beam splitting prism to said light chopper and onto said photoelectric transducer, and an electrical bridge having the output of said photoelectric transducer connected across one of its diagonals and a current indicating means connected across its opposite diagonal for indicating photometric coincidence due to optical compensation obtained by means of said adjustable optical compensator, and a range scale mechanically linked to said optical compensator for indicating the range.

2. The invention as set forth in claim 1 wherein said light chopper consists of a motor driven disc for modulating said two pairs of parallel light beams, said disc formed with one half of its surface transparent and its other half opaque.

3. The invention as set forth in claim 2 wherein said means for directing the two pairs of parallel beams formed by said double beam splitter consists of a first mirror and a second mirror spaced from opposite sides of said double beam splitting prism and at a right angle to the light beams from said first and second telescopes.

4. The invention as set forth in claim 3 wherein one of said pairs of parallel beams consist of two separate beams of light flux from the beam of said first telescope, the other pair of said beams consists of two separate beams of light flux from the beam of said second telescope.

5. A photoelectric range finder comprising a first telescope for producing a first light beam containing the image of a target, a second telescope provided with optical inverting means for producing a second light beam with an inverted image of said target, said first and second telescopes being laterally spaced from each other, a target acquisition telescope positioned intermediate said first and second telescopes and movable in the same plane therewith, adjustable optical compensator means in said second telescope, a double beam splitting prism positioned between the exit ends of said first and second telescopes whereby said light beams are each split into a pair of parallel beams, one pair of said parallel beams consisting of a left beam of light flux divided out of said first light beam and a right beam of light flux divided out of said second light beam, the other pair of said parallel beams consisting of a right beam of light flux divided out of said first light beam and a left beam of light flux divided out of said second light beam, a photoelectric transducer, means for modulating said pairs of light fluxes comprising a disc having one half opaque and one half transparent positioned intermediate said double beam splitting prism and said photoelectric transducer, means for directing said pairs of light fluxes to said disc and onto said photoelectric transducer, electrical bridge means having the output of said photoelectric transducer connected across one of its diagonals and a current indicating means across its opposite diagonal for indicating photometric coincidence when optical compensation is obtained by manually operating said adjustable optical compensator, range indicating means coupled to said adjustable optical compensator, artificial light means for illuminating said photoelectric transducer, and means for automatic ranging.

6. The invention as set forth in claim 5 wherein said last mentioned means comprises a servomotor mechanically coupled to said optical compensator having a digital register coupled thereto, a servoamplifier coupling the output of said electrical bridge means to said servomotor, and mechanical means coupling said servomotor to a variable arm of said bridge, the error signal of said bridge which is produced during the ranging period being amplified by said servoamplifier and fed into said servomotor which simultaneously actuates said variable arm, the digital register and the compensator until photometric coincidence which results in electric equilibrium in the bridge whereupon the range is obtained.

7. A photoelectric range finder comprising a first telescope for producing a first light beam containing the image of a target, a second telescope provided with optical means for producing a second light beam with an inverted image of said target, said first and second telescopes being laterally spaced from each other, optical compensation means in said second telescope, a target acquisition telescope positioned intermediate said first and second telescopes and movable in the same plane therewith, a beam deflecting prism, a photoelectric transducer spaced from and in alignment with said beam deflecting prism, said beam deflecting prism positioned between the exit ends of said first and second telescopes, a motor driven beam splitting and modulation means positioned intermediate said beam deflecting prism and said photoelectric transducer whereby said first and second light beams are each split into a pair of parallel beams alternately cut off from the photoelectric transducer, one pair of said parallel beams consisting of a left beam of light flux divided out of said first light beam and a right beam of light flux divided out of said second light beam, the other pair of said parallel beams consisting of a right beam of light flux divided out of said first light beam and a left beam of light flux divided out of said second light beam, said beam deflecting prism directing said light beams in spaced relationship to said beam splitting and modulation means and onto said photoelectric transducer, electrical bridge means having the output of said photoelectric transducer connected across one of its diagonals and a current indicating means across its opposite diagonal for indicating photometric coincidence when optical compensation is obtained by manually operating said optical compensator, range indicating means coupled to the optical compensator, artificial light means for illuminating said photoelectric transducer and means for automatic control of said range finder.

8. The invention as set forth in claim 7 wherein said means for automatic control comprises a servomotor mechanically coupled to said optical compensator having a digital register coupled thereto, a servoamplifier coupling the output of said electrical bridge to said servomotor, and mechanical means coupling said servomotor to a variable arm of said electrical bridge means, the error signal of said electrical bridge means which is produced during the ranging period being amplified by said servoamplifier and fed into said servomotor which simultaneously actuates said variable arm, the digital register and optical compensator until photometric coincidence which results in electrical equilibrium in the bridge whereupon range is obtained.

9. The invention in accordance with claim 8 wherein said beam splitting and modulation means comprises a hollow cylinder divided along its longitudinal axis into two halves forming a circumferential beam splitting line intermediate the ends of said cylinder, said halves each formed alternately with oqapue segments, the opaque segments of one of said halves corresponding to the transparent segments of the other of said halves, and the transparent segments of said one of said halves corresponding to the opaque segments of the said other of said halves.

(References on following page)

References Cited

UNITED STATES PATENTS 3,002,093  9/1961  Kis et al. _____ 88—1
3,143,588  8/1964  Donald et al. _____ 88—1

JEWELL H. PEDERSEN, *Primary Examiner.*

BENJAMIN A. BORCHELT, *Examiner.*

V. R. PENDEGRASS, F. L. EVANS,
*Assistant Examiners.*